United States Patent
Morgan

(10) Patent No.: US 9,403,706 B2
(45) Date of Patent: Aug. 2, 2016

(54) WATER TREATMENT COMPOSITION

(75) Inventor: Robert Peter Morgan, Denham (AU)

(73) Assignee: Marine Easy-Clean Pty Ltd., South Fremantle (AU)

( * ) Notice: Subject to any disclaimer, the term of this patent is extended or adjusted under 35 U.S.C. 154(b) by 527 days.

(21) Appl. No.: 12/451,172

(22) PCT Filed: May 1, 2008

(86) PCT No.: PCT/AU2008/000606
§ 371 (c)(1),
(2), (4) Date: Feb. 4, 2010

(87) PCT Pub. No.: WO2008/131495
PCT Pub. Date: Nov. 6, 2008

(65) Prior Publication Data
US 2010/0147774 A1    Jun. 17, 2010

(30) Foreign Application Priority Data

May 1, 2007    (AU) .............................. 2007902293

(51) Int. Cl.
*C02F 1/68* (2006.01)
*C02F 101/20* (2006.01)
*C02F 103/00* (2006.01)

(52) U.S. Cl.
CPC ............. *C02F 1/68* (2013.01); *C02F 2101/20* (2013.01); *C02F 2103/007* (2013.01); *Y02W 10/37* (2015.05)

(58) Field of Classification Search
USPC ........................................ 524/487; 252/71
See application file for complete search history.

(56) References Cited

U.S. PATENT DOCUMENTS

| | | | |
|---|---|---|---|
| 3,753,676 A | 8/1973 | Halley | |
| 4,043,829 A * | 8/1977 | Ratledge et al. | 106/271 |
| 5,244,503 A | 9/1993 | Fabian | |
| 5,614,458 A | 3/1997 | Webb et al. | |
| 5,717,023 A | 2/1998 | Batty et al. | |
| 5,833,739 A * | 11/1998 | Klatte et al. | 95/136 |
| 6,632,363 B1 | 10/2003 | Grech et al. | |
| 2004/0046149 A1 | 3/2004 | Meyer | |
| 2006/0247359 A1 * | 11/2006 | Dower | 524/487 |
| 2008/0035881 A1 * | 2/2008 | Kim | 252/71 |
| 2009/0317515 A1 * | 12/2009 | Lohscheidt et al. | 426/61 |

FOREIGN PATENT DOCUMENTS

| | | |
|---|---|---|
| EP | 0453414 A1 | 10/1991 |
| GB | 2354184 A | 3/2001 |
| JP | 2003-245690 | 9/2003 |

OTHER PUBLICATIONS

PCT IPRP/Search Report dated Nov. 3, 2009, in corresponding International Application No. PCT/AU2008/000606.
European Search Report dated May 12, 2011 in corresponding European Application No. 08733432.2.

* cited by examiner

*Primary Examiner* — Chester Barry
(74) *Attorney, Agent, or Firm* — Harness, Dickey & Pierce, P.L.C.

(57) ABSTRACT

A composition for the treatment of water comprising a treating component and a support wherein the treating component is a liquid organic compound, and the support is a solid organic compound.

12 Claims, No Drawings

WATER TREATMENT COMPOSITION

FIELD OF THE INVENTION

The present invention relates to a water treatment composition.

BACKGROUND ART

Contributions to wafer pollution come in many forms and include substances drawn from the air, silt from soil erosion, chemical fertilizers and pesticides, runoff from septic tanks, outflow from livestock feedlots, chemical wastes from industries, and sewage and other urban wastes from cities and towns.

When organic matter exceeds the capacity of microorganisms in the water to break it down and recycle it, the excess of nutrients in such matter can encourage algal water blooms. When these algae die, their remains add further to the organic wastes already in the water, and eventually the water becomes deficient in oxygen. Organisms that do not require oxygen then attack the organic wastes, releasing gases such as methane and hydrogen sulfide, which are harmful to the oxygen-requiring forms of life. The result is a foul-smelling, waste-filled body of water.

Modern sewage systems include domestic and industrial sewers and storm sewers. Sewage treatment plants remove organic matter from waste water through a series of steps. As sewage enters the plant, large objects (such as wood and gravel) are screened out; grit and sand are then removed by settling or screening with finer mesh. The remaining sewage passes into primary sedimentation tanks where suspended solids (sludge) settle out. The remaining sewage is aerated and mixed with microorganisms to decompose organic matter. A secondary sedimentation tank allows any remaining solids to settle out; the remaining liquid effluent is discharged into a body of water. Sludge from the sedimentation tanks may be disposed of in landfills, dumped at sea, used as fertilizer, or decomposed further in heated tanks (digestion tanks) to produce methane gas to power the treatment plant.

Aquariums, both domestic and commercial suffer from the need to regularly replace the water due to the buildup of various toxins. For example, salt water aquariums generally need to have 25% to 75% of the water changed every 7 to 10 days with normal aquarium filters, although large bacteria filters usually the same size to three times larger than the tank can hold the same water for up to 3 months.

Biological filtration systems function by providing an area in a tank which is isolated from animals. The filter should have a high surface area (e.g. some biological filters use soft sponges, small plastic hollow balls full of holes or pebbles) for non-toxic bacteria to grow on which feed on ammonia and nitrite produced by the fishes waste. If this waste is not removed, fish may die within days. Generally, the water in salt water tanks must be changed every 7 to 10 days and the water in fresh water tanks, every 20 to 40 days depending on fish density. The amount of time between water changes from fresh water to salt water is different because salt water fish generally have a higher metabolism than fresh water fish.

The preceding discussion of the background to the invention is intended to facilitate an understanding of the present invention. However, it should be appreciated that the discussion is not an acknowledgement or admission that any of the material referred to was part of the common general knowledge in Australia, or anywhere else, as at the priority date of the application.

Throughout the specification, unless the context requires otherwise, the word "comprise" or variations such as "comprises" or "comprising", will be understood to imply the inclusion of a stated integer or group of integers but not the exclusion of any other integer or group of integers.

DISCLOSURE OF THE INVENTION

Those skilled in the art will appreciate that the invention described herein is susceptible to variations and modifications other than those specifically described. It is to be understood that the invention includes all such variations and modifications. The invention also includes all of the steps, features, compositions and compounds referred to or indicated in the specification, individually or collectively and any and all combinations or any two or more of the steps or features.

The present invention is not to be limited in scope by the specific embodiments described herein, which are intended for the purpose of exemplification only. Functionally equivalent products, compositions and methods are clearly within the scope of the invention as described herein.

The entire disclosures of all publications (including patents, patent applications, journal articles, laboratory manuals, books, or other documents) cited herein are hereby incorporated by reference.

In accordance with the present invention, there is provided a composition for the treatment of water comprising a treating component and a support, wherein the treating component is a liquid organic compound, and the support is a solid organic compound.

In the context of this specification, the terms liquid and solid refer to the state of the extractant and support at ambient temperature.

Preferably, the treating component is substantially insoluble in water.

Preferably, the support is substantially insoluble in water.

Preferably, the support is adapted to retain the treating component. Where the composition is placed in a volume of water, the support preferably inhibits the treating component from spreading throughout the volume of water.

In the context of the present invention, the term organic compound shall encompass chemical compounds containing carbon. It will be understood that the term will encompass chemical compounds with C—C bonds and C—H bonds. It will be appreciated that the chemical compound may comprise at least one functional group such as alcohol, aldehyde, ketone, amide, amine, carboxylic acid, ether and ester.

It will be appreciated that the support may comprise any form of organic compound that is substantially insoluble in water including waxes, fats, plastics, ceramics and greases or mixtures thereof.

Where the support comprises wax, the wax preferably comprises long chain hydrocarbons and/or esters of long chain alcohols and long chain fatty acids.

In a particular form of the invention; the wax is petroleum wax. In the context of this specification, the term petroleum wax encompasses both paraffin wax and microcrystalline wax, wherein paraffin wax is a substantially fully saturated and substantially straight chain hydrocarbon and microcrystalline wax is a substantially fully saturated hydrocarbon with a significant proportion of branched and cyclic structures.

Where the support comprises paraffin wax, the carbon number of the paraffin wax is preferably greater than about 25. More preferably, the carbon number is between about 25 and 45.

Preferably, the paraffin wax has a melting point of between about 45° C. and about 70° C. More preferably, the paraffin wax has a melting point of about 55° C.

Where the support comprises microcrystalline wax, the carbon number of the microcrystalline wax is preferably greater than about 25. More preferably, the carbon number is between about 25 and 45.

In one form of the invention, the support comprises a mixture of paraffin wax, and microcrystalline wax. It should be appreciated that the optimum ratio of paraffin wax and microcrystalline wax will vary according to the application of the composition. For example, differences in water properties and temperature may affect the final constitution of the support.

Preferably, the support comprises between about 0 to 95% by weight paraffin wax and between about 5 to 100% by weight microcrystalline wax. More preferably, the support comprises between about 0 to 70% by weight paraffin wax and between about 30 to 100% by weight microcrystalline wax. More preferably still, the support comprises between about 20 to 60% by weight paraffin wax and between about 40 to 70% by weight microcrystalline wax. More preferably still, the support comprises between about 40 to 50% by weight paraffin wax and between about 40 to 50% by weight microcrystalline wax.

Preferably, the treating component is provided in the form of an oil. In one form of the invention, the treating component is provided in the form of a mineral oil. Where the oil is a mineral oil, the oil is preferably a paraffin oil. In the context of this specification, the term 'paraffin oil' is intended to encompass a liquid hydrocarbon or mixture of liquid hydrocarbons obtained from petroleum.

Where the treating component is an oil, the treating component preferably comprises between about 0.1 to 40% by weight of the composition. More preferably, the treating component comprises between about 5 to 20% by weight of the composition. It will be appreciated that the final amount of treating component used in the composition will depend on the final use of the composition and the nature of the treating component used. For example, depending on the properties of the support, if the proportion of oil is too high, the composition may not remain in a solid form.

In one form of the invention, the composition may comprise one or more colouring agents. Where the composition comprises a colouring agent, the colouring agent may be provided in the form of a vegetable dye or a pigment, for example those used in the tinting of paints.

The composition of the present invention may be used to treat aquarium water, sewage water, fountain water, industrial waste water as well as water from dams, ponds, lakes, rivers, lagoons and oceans.

Preferably, the body of water treated by the composition is agitated.

It is advantageous to provide a large surface area of the composition.

It will be appreciated that the mass of the composition used in a body of water will depend on the volume of water, the nature, use and impurity level of the water and the concentrations of the constituents in the composition.

Without being limited by theory, it is believed that the composition can decrease the concentration of impurities including heavy metals in water.

BEST MODE(S) FOR CARRYING OUT THE INVENTION

The method and inhibitor of the present invention will now be described, by way of example only, with reference to a number of embodiments of the water treatment composition. By way of example, the composition of the present invention is described in the context of a water treatment composition used to treat aquarium water, wishing well water and sewage water although such should not be seen as limiting the generality of the foregoing description.

Composition Preparation

It has been found that the use of paraffin to microcrystalline wax in percentages of 30% paraffin and 70% microcrystalline, 40% paraffin and 60% microcrystalline, 50% paraffin and 50% microcrystalline, 60% paraffin and 40% microcrystalline and 70% paraffin and 30% microcrystalline provide similar results. However, it has been found that 50/50 mixtures were easier to work with.

Microcrystalline wax with a melting point of 80° C., an equal portion by weight of paraffin wax with a melting point of 55° C. and a portion of paraffin oil equivalent to either 5%, 10%, 20% or 33% of the total mass of the microcrystalline and paraffin waxes were added to a container at room temperature and heated to about 100° C. with stirring and both waxes and the oil melted and blended. The healing was removed and the molten composition poured into moulds. The paraffin oil was provided in the form of Delo 400 engine oil, pure paraffin oil or crude paraffin oil.

It will be appreciated that the amount of the composition to use with a body of water will depend on many factors, including the volume of water, the water quality and the degree of aeration and flow of the water.

For the aquariums, it is common to refer to water quantities by tank length measured in feet. It will be appreciated that such a measure is simplistic and provide no information about tank shape. In the absence of any information about tank shape, such a reference is generally used with reference to rectangular aquariums.

For tanks under two foot, wax blocks of about 100 g are recommended. For tanks of three to four foot, wax blocks of about 250 g are recommended. For tanks of six foot, wax blocks of about 500 g are recommended.

As a generality, six foot tanks are about 1200 mm×350 mm×300 mm with a volume of about 126 L and four foot tanks are about 1800 mm×400 mm×350 mm with a volume of about 252 L.

It will be appreciated that the amount of the paraffin oil in the composition when used in aquariums will depend on many factors, including fish or animal density (low, medium or high) and the amount of natural light striking the water. It will be appreciated that low, medium and high density may vary with fish size and water quantity e.g. six small fish (guppies) will comprise a similar density to one medium sized goldfish. In a four foot tank with 126 L capacity, four or less average sized goldfish would be considered low-density, between five and eight fish, medium density and nine fish and more high density.

It will further be appreciated that the recommended mass of a wax block will be influenced by the concentration of paraffin oil in the block. Without being limited by theory, it is believed that the animal density affects overall animal waste output. For example, for tanks with a low to medium fish density, a paraffin oil content of 5% may be sufficient, whilst tanks with higher densities may require paraffin oil contents of 10%. Indoor tanks that are not exposed directly to sunlight may require lower paraffin oil contents than equivalent tanks that are outside or located close to a window, for example, 5% v 10%. Without being limited by theory, it is believed that this is due to the contribution of light on algae growth. Whilst the present composition may not necessarily stop algae growth, it is believed that it does help to stop the growth of nutrients that some algae feed on.

For outdoor water sources such as fishponds and wishing wells, factors to consider are animal density (no animals, low, medium, high density) and the amount of natural light. For low density fishponds or ponds with no fish, a paraffin content of about 5% is recommended. For fish ponds with medium or high density, a paraffin content of about 10% is recommended. For a fully shaded pond, a paraffin content of about 5% is recommended and for a partly shaded pond, a paraffin content of about 5% is recommended, although these numbers will also depend on fish density. It will be appreciated that as the composition does not necessarily kill algae, ponds in full sun may still turn green.

For small outdoor ponds and wells (e.g. less than 250 L water) wax blocks of about 250 g are recommended. For small ponds up to 600 L water, wax blocks of about 500 g are recommended. For large ponds from about 600 L to about 2000 L, wax blocks of about 500 g are recommended. Where these ponds are in direct sunlight, it is recommended that the amounts are doubled.

Findings

Throughout the specification, the following nomenclature is used to describe different embodiments of the invention.

Composition A—diesel engine oil (Delo 400) with equal portions by weight of paraffin wax and microcrystalline wax;

Composition B—paraffin oil with equal portions by weight of paraffin wax and microcrystalline wax;

Composition C—crude paraffin oil with equal portions by weight of paraffin wax and microcrystalline wax;

The amount of treating component in each oil is depicted by the number following the letters A, B or C as shown below.

Composition A5—a composition with 5% diesel engine oil by weight;

Composition B10—a composition with 10% paraffin oil by weight and

Composition C20—a composition with 20% crude paraffin oil by weight.

It is believed that paraffin wax 55 comprises about 1% paraffin oil.

The following Examples serve to more fully describe the manner of using the above-described invention, as well as to set forth the best modes contemplated for carrying out various aspects of the invention. It is understood that these Examples in no way serve to limit the true scope of this invention, but rather are presented for illustrative purposes.

Trial 1

A trial was conducted on a 6 ft long (250 L capacity) domestic salt water fish tank holding 11 fish and 9 crustaceans maintained with a biological filtration system where previously, one third to half, of the water was replaced ovary 7 to 10 days to maintain fish health. A 500 g block of composition A10 was placed in the tank and allowed to float on the surface of the water. After 14 days, the water in the tank remained clear and the fish appeared to be in good health and consequently, the water was not changed. Under normal circumstances, failure to change the water after 14 days would in all likelihood, kill the animals. After 17 days, the water in the tank remained clear and the animals appeared to be in good health. On day 17, the composition was removed from the tank and observations continued. As can be seen from Table 1, the water quickly became murky and odorous and the animals appeared to be stressed. The composition was replaced on day 19 and the water became clear within a day and the animals appeared to resume good health. The water in the tank was not changed at this time.

TABLE 1

Composition A10 in domestic salt water fish tank.

| Period | Visual Animal Health | Water Appearance |
|---|---|---|
| Day 1 (composition introduced) | Good | Clear |
| Day 2 | Good | Clear |
| Day 3 | Good | Clear |
| Day 4 | Good | Clear |
| Day 5 | Good | Clear |
| Day 6 | Good | Clear |
| Day 7 | Good | Clear |
| Day 8 | Good | Clear |
| Day 9 | Good | Clear |
| Day 10 | Good | Clear |
| Day 11 | Good | Clear |
| Day 12 | Good | Clear |
| Day 13 | Good | Clear |
| Day 14 | Good | Clear |
| Day 15 | Good | Clear |
| Day 16 | Good | Clear |
| Day 17 (composition removed) | Good | Clear |
| Day 18 | Stressed | Murky and odorous |
| Day 19 (composition replaced) | Stressed, not eating | Murky and odorous |
| Day 20 | Good, eating | Clear |

Given that removal of the composition from the tank at day 17 resulted in rapid deterioration of the water quality and that reintroduction of the composition rapidly clarified the water, it is believed that it was the presence of the composition that caused the water to remain clear for the first 16 days rather than any property of the water itself.

The trial was continued to investigate the length of time the composition remained effective without changing the water. As shown in Table 2, the water in the tank remained clear and the animals appeared healthy for 6 months.

TABLE 2

Composition A10 in domestic salt water fish tank.

| Period | Water clarity and animal health |
|---|---|
| Day 20 | Water clear and all animals alive and healthy |
| Day 25 | Water clear and all animals alive and healthy |
| Day 30 | Water clear and all animals alive and healthy |
| Day 35 | Water clear and all animals alive and healthy |
| Day 40 | Water clear and all animals alive and healthy |
| Month 2 | Water clear and all animals alive and healthy |
| Month 3 | Water clear and all animals alive and healthy |
| Month 4 | Water clear and all animals alive and healthy |
| Month 5 | Water clear and all animals alive and healthy |
| Month 6 | Water clear and all animals alive and healthy |

It is noted that a small number of the fish did die during the trial, although they were believed to have been killed by a larger fish. The dead fish were left in the tank for three days before being removed with no effect on the appearance of the water or the apparent health of the remaining fish. It is noted that the presence of dead fish in a fish tank would normally affect the health of the remaining animals within 24 hr.

Trial 2

To investigate whether the effectiveness of the composition was from the presence of the oil itself or the paraffin and/or microcrystalline wax, trials were conducted with various compositions. Tank 1 contained no composition, tank 2 contained a 20 g block of paraffin wax, tank 3 contained a 20 g block of microcrystalline wax and tank 4 contained a 20 g block of composition A10. Each tank contained 30 L of desalinated tap water and a small tree branch. The blocks of wax in tanks 2, 3 and 4 were allowed to float on top of the water for the duration of the trial.

TABLE 3

Control, paraffin wax, microcrystalline wax and Composition A10 over time.

| Period | Tank 1 | Tank 2 | Tank 3 | Tank 4 |
|---|---|---|---|---|
| Composition | None | Paraffin wax | Microcrystalline wax | A10 |
| Day 5 | clear | clear | clear | clear |
| Day 10 | clear | clear | clear | clear |
| Day 15 | clear | clear | clear | clear |
| Day 20 | clear | clear | clear | clear |
| Day 25 | clear | clear | clear | clear |
| Day 30 | browning | clear | browning | clear |
| Day 35 | brown | clear | brown | clear |
| Day 40 | brown | browning | brown | clear |
| Day 45 | brown | brown | brown | browning |

As shown in Table 3, the results show that the use of microcrystalline wax alone (Tank 3) did not increase the length of time for the water to brown compared to the control (Tank 1). Without being limited by theory, it is believed that the use of paraffin wax (Tank 2) increased the time compared to the control due to the small amounts of paraffin oil present in the paraffin wax. Increased amounts of paraffin oil (Tank 4) provided improved results.

None of the tanks were aerated or agitated and the water in each tank was substantially stationary. Without being limited by theory, it is believed that this contributed to the decreased length of time composition A10 'remained active' compared to Trial 1.

Trial 3

Using the aquarium of Trial 1, a block of composition A10 (approximately 150 g) was formed into a hollow cylinder and placed on the outlet of the water filter such that all of the water passing through the filter also passed over the cylinder. The trail was conducted to determine the effect of water flow on the efficacy of the composition as shown in Table 4.

TABLE 4

Composition A10 adjacent water filter over time.

| Period | Water clarity and animal health |
|---|---|
| Day 20 | Water clear and all animals alive and healthy |
| Day 25 | Water clear and all animals alive and healthy |
| Day 30 | Water clear and all animals alive and healthy |
| Day 35 | Water clear and all animals alive and healthy |
| Day 40 | Water clear and all animals alive and healthy |
| Month 2 | Water clear and all animals alive and healthy |
| Month 3 | Water clear and all animals alive and healthy |
| Month 4 | Water clear and all animals alive and healthy |
| Month 5 | Water clear and all animals alive and healthy |
| Month 6 | Water clear and all animals alive and healthy |

After 6 months, 200 live cockles where placed into the tank and after about 4 weeks they were all dead, presumably a result of starvation. At this time, the water had turned muddy brown and odorous. However, the fish remained alive. Approximately 90% of the dead cockles were removed from the tank and the cylinder of composition A10 (approximately 150 g) replaced with a cylinder of composition B20 (approximately 150 g) comprising paraffin wax (40%), microcrystalline wax (40%) and paraffin oil (20%) and within 1 hr, the water had become light brown and after 24 hr, the brown colour had disappeared. A yellow residue was present in the tank and the wax sample had turned yellow. The water appeared to have a yellow tinge.

After the water had cleared, composition B20 (approximately 150 g) was replaced with composition B5 (approximately 150 g) comprising paraffin wax (48%), microcrystalline wax (47%) and paraffin oil (5%) and the tank observed over time. After a further 7 months, the water remained clear and the yellow residue subsisted as shown in Table 5.

TABLE 5

Composition B5 adjacent water filter over time.

| Period | Water clarity and animal health |
|---|---|
| Month 7 | Water clear with a yellow tinge and all animals alive and healthy |
| Month 8 | Water clear with a yellow tinge and all animals alive and healthy |
| Month 9 | Water clear with a yellow tinge and all animals alive and healthy |
| Month 10 | Water clear with a yellow tinge and all animals alive and healthy |
| Month 11 | Water clear with a yellow tinge and all animals alive and healthy |
| Month 12 | Water clear with a yellow tinge and all animals alive and healthy |
| Month 13 | Water clear with a yellow tinge and all animals alive and healthy |

After 14 months, composition B5 was replaced with composition C5 (approximately 150 g) comprising paraffin wax (48%), microcrystalline wax (47%) and paraffinic crude oil (5%) and within 24 hr the yellow tinge to the water had disappeared as shown in Table 6.

TABLE 6

Composition C5 adjacent water filter over time.

| Period | Tank and Animal Health |
|---|---|
| Month 14 | Tank clear and all animals alive and healthy |
| Month 15 | Tank clear and all animals alive and healthy |
| Month 16 | Tank clear and all animals alive and healthy |
| Month 17 | Tank clear and all animals alive and healthy |
| Month 18 | Tank clear and all animals alive and healthy |

Analysis of the water after 18 months indicated that all readings were within normal ranges (Table 7) and only a small change of water was necessary.

TABLE 7

Analysis of water from Trial 3 after 18 months.

| | |
|---|---|
| Bacterial count | 11,300 colony forming units per mL |
| pH | 7.7 |
| Ammonia (tan) | <0.2 mg/L |
| Nitrate | 230 mg/L |
| Nitrite | 0.03 mg/L |
| Reactive phosphorus (phosphates) | 6 mg/L |
| Total dissolved solids | 63,000 mg/L |
| Total suspended solid | <5 mg/L |

As can be seen from Table 7, the ammonia and nitrite levels were low, indicating that the wax may have been functioning as a biological filter. The high nitrate and phosphate concentrations may have been a reflection that the water had not been changed over the 18 month period. These compounds are known to build up over time and are a reason why it is recommended that aquarium water is regularly replaced. The total dissolved solids reading was a reflection of the salinity of the water and was higher than usual due to the lack of water change. The bacterial count was high, although it should be appreciated that the count reflects many types of bacteria and is not necessarily an indication that the water is harmful.

The pH of the water was not checked on site but a sample transferred to a laboratory. It is possible that the storage of the water during transfer may have affected the reading. Notwithstanding the potential error, 7.7 is low for seawater (usually 8.1) and may indicate a build up of carbon dioxide which can be stressful for some marine fish.

Standard small biological filters are known to maintain the health of a salt water tank for up to 70 days without water change. Trial 3 shown that the composition of the present invention may be employed to maintain a tank for over 500 days without changing the water.

Trial 4

Trials were conducted on ten 25 L salt water aquariums to establish the time involved for a tank under a normal residential aquarium environment to reach a toxic level and to demonstrate how the composition of the present invention can provide an environment in which fish may five in for long periods. The water was sea water sourced from the beach at Denham, Western Australia. Two butter fish weighing approximately 100 g each were placed into each tank and fed daily and the water topped up as required to account for evaporative losses. The water was not replaced for the duration of the trial.

Tanks 1, 4 and 7 contained small biological sponge filters, tanks 2, 5 and 6 contained 150 g samples of composition A10, tanks 3 and 8 contained 150 g samples of microcrystalline wax and tanks 9 and 10 contained 150 g samples of paraffin 55 wax.

TABLE 8

Fish health in the presence of biological filters, composition A10, microcrystalline wax and paraffin wax over time.

| Tank | Comp | Day 20 | Day 40 | Day 50 | Day 70 | Day 80 | Day 158 |
|---|---|---|---|---|---|---|---|
| 1 | Bio | Healthy | Healthy | Healthy | Dead | | |
| 4 | Bio | Healthy | Healthy | Unhealthy | Dead | | |
| 7 | Bio | Healthy | Healthy | Healthy | Unhealthy | Dead | |
| 2 | A10 | Healthy | Healthy | Healthy | Healthy | Healthy | Healthy |
| 5 | A10 | Healthy | Healthy | Unhealthy | Healthy | Healthy | Healthy |
| 6 | A10 | Healthy | Healthy | Healthy | Healthy | Healthy | Healthy |
| 3 | Micro | Healthy | Healthy | Dead | | | |
| 8 | Micro | Healthy | Healthy | Dead | | | |
| 9 | Para55 | Healthy | Healthy | Healthy | Healthy | Dead | |
| 10 | Para55 | Healthy | Healthy | Healthy | Healthy | Dead | |

As shown in Table 8, the use of microcrystalline wax provided a viable tank environment for no more than 50 days. The biological sponge filters maintained the tanks for 60 to 70 days before the tanks were unable to sustain the fish. The use of paraffin wax which comprises about 1% paraffin oil maintained a healthy environment for over 70 days. Composition A10 comprising 10% paraffin oil maintained a healthy environment for 158 days after which time, the trial ceased.

Trial 5

A trial was conducted on a 3 foot fresh water tank with guppies, goldfish and yabbies. A 100 g sample of composition B5 formed into a hollow cylinder was placed onto the outlet of the filter system so that all filtered water passed over the composition.

TABLE 9

Composition B5 over time.

| Period | Observations |
|---|---|
| Month 1 | Water clear |
| Month 2 | Water clear, both large yabbies dead, small yabbies healthy |
| Month 3 | Water clear, glass beginning to go light green |
| Month 4 | Water clear, glass green, all fish and remaining yabbies healthy |
| Month 5 | Water clear, glass dark green, all fish and remaining yabbies healthy |

As shown in Table 9, the trial showed that the composition did not appear to be harmful to fresh water animals. The cause of death of the yabbies was not investigated.

Trial 6

A trial was conducted on a 5 foot (200 L capacity) fresh water tank with guppies, goldfish and yabbies. A 150 g sample of composition B10 was placed into the filter system.

TABLE 10

Composition B10 over time.

| Period | Observations |
|---|---|
| Day 1 | Water clear, fish and yabbies healthy |
| Day 2 | Water clear, fish and yabbies healthy |
| Day 3 | Water clear, yabbies dead |
| Day 4 | Water clear, 3 goldfish dead |

As shown in Table 10, after 4 days, the tank was no longer able to sustain the animals. Without being limited by theory, it is believed that the location of the composition inside the water filter affected the bacteria on the filter and compromises the ability of the filter to maintain nitrates and phosphates at a viable level.

Trial 7

A wishing well with a capacity of 130 L was emptied and filled with fresh tap water and a 200 g sample of composition A10 placed into the piping of the water pump. As shown in Table 11, the composition maintained the water clear for 6 months. Under normal circumstances, it is believed that the water would have gone murky in 7 to 14 days in the absence of the composition, depending on the weather.

TABLE 11

Composition A10 in a wishing well over time.

| Period | Water clarity |
| --- | --- |
| Month 1 | Well clear |
| Month 2 | Well clear |
| Month 3 | Well clear, sides of the well green, coins in well black |
| Month 4 | Well clear, sides of the well dark green |
| Month 5 | Well clear, sides of the well dark green |
| Month 6 | Well clear, sides of the well thicker green |
| Month 7 | Well murky |

Trial 8

Trial 7 was repeated using Composition B20 (150 g) and the results shown in Table 12.

TABLE 12

Composition B20 in a wishing well over time.

| Period | Water clarity |
| --- | --- |
| Month 1 | Well clear |
| Month 2 | Well clear |
| Month 3 | Well clear |
| Month 4 | Well clear |
| Month 5 | Well clear, sides of the well light green |
| Month 6 | Well clear, sides of the well greener |
| Month 7 | Well murky |

The 7 month water was tested (prior to the water going murky) and the results shown in Table 13.

TABLE 13

Analysis of water from Trial 8 after 7 months.

| Bacterial count | 122,000 colony forming units per mL |
| --- | --- |
| pH | 7.7 |
| ammonia (YAN) | <0.2 mg/L |
| Nitrate | <0.01 mg/L |
| Nitrite | <0.01 mg/L |

TABLE 13-continued

Analysis of water from Trial 8 after 7 months.

| Reactive phosphorus (phosphates) | 0.05 mg/L |
| --- | --- |
| Total dissolved solids | 22 mg/L |
| Total suspended solids | <5 mg/L |

The results show that Composition B20 maintained the clarity of the water longer than Composition A10. There was no blackening of the coins in Trial 8, and it is believed that the coin blackening in Trial 7 may have resulted from components in the engine oil used in the preparation of the composition. The water in Trial 8 went murky after 7 months although this may have been due to an influx of water and dirt into the well after a heavy rainfall.

Trial 9

A trial was conducted on a fresh water pond about 3 m long and about 30 cm deep (350 L capacity). A 350 g sample of Composition B20 was placed into the pond and the resulted are shown in Table 14.

TABLE 14

Composition B20 in a wishing well over time.

| Period | Observation |
| --- | --- |
| 1 month | Pond clear |
| 2 month | Pond clear |
| 3 month | Pond clear, sides of the pond light green |
| 4 month | Pond clear, sides of the pond light green |
| 5 month | Pond clear, sides and floor of the pond green |
| 6 month | Pond clear, green algae 1 cm thick |
| 7 month | Pond clear, green algae stringing up to 5 cm in places |
| 8 month | Pond water still clear, green algae stringing up to 20 cm in places |

It is apparent from Table 14 that the composition of the present invention does not harm algae in a fresh water pond.

Trial 10

Trials were conducted on species of algae (*Isochrysis, Pavlova Lutheri, Chaetoceros Calcitrans* and *Chaetoceros Muelleri*) to determine whether the Composition is directly harmful to algae. Samples of the algae cultures were placed in 500 mL flasks (350 mL of culture) with Composition C10 (10 g) or in 2 L flasks (1.6 L of culture) with Composition C10 (40 g). As shown in Table 15, the algae were stable in the presence of Composition C10.

TABLE 15

Algae stability in the presence of Composition C10.

| Period | Cal 500 mL | Pav 500 mL | Tiso 500 mL | C.M. 500 mL | Cal 2 L | Pav 2 L | Tiso 2 L | C.M. 2 L |
| --- | --- | --- | --- | --- | --- | --- | --- | --- |
| Week 1 | Healthy | Healthy | Healthy | Healthy | Healthy | Healthy | Healthy | Healthy |
| Week 2 | Healthy | Healthy | Healthy | Healthy | Healthy | Healthy | Healthy | Healthy |
| Week 3 | Healthy | Healthy | Healthy | Healthy | Healthy | Healthy | Healthy | Healthy |
| Week 4 | Healthy | Healthy | Healthy | Healthy | Healthy | Healthy | Healthy | Healthy |
| Week 5 | Healthy | Healthy | Healthy | Healthy | Healthy | Healthy | Healthy | Healthy |
| Week 6 | Healthy | Healthy | Healthy | Healthy | Healthy | Healthy | Healthy | Healthy |

Trial 11

Samples of sewage water taken from the sewage ponds in Denham, Western Australia were placed into four separate 30 L glass tanks, approximately 1 foot deep and aerated. At this stage the water was dark green with a strong odour and there was foam at the top of the tanks.

The clarity of the water in each tank over time was monitored using a sliding scale from 1 to 10 wherein 1 represents clear, colourless water and 10 represents opaque water.

Tank 1 was a control with aeration only
Tank 2 was treated with 300 g composition C33.
Tank 3 was treated with 300 g composition B20.
Tank 4 was treated with 300 g composition A20.

TABLE 16

Clarity observations of sewage water over time.

| | Tank 1 | Tank 2 | Tank 3 | Tank 4 |
|---|---|---|---|---|
| Day 1 | Clarity 10 | Clarity 10 | Clarity 10 | Clarity 10 |
| Day 5 | Green foam on top of water, clarity 10 | No foam, clarity 10 | Mild foaming, clarity 10 | Mild foaming, clarity 10 |
| Day 10 | Green foam | No foam, light brown water, clarity 10 | Mild foaming | Mild foaming, clarity 8 |
| Day 15 | Green foam, green water, clarity 10 | No foam, brown water, clarity 7 | Mild foaming, green water, clarity 10 | Mild foaming, green water, clarity 6 |
| Day 20 | No foam, clarity 10 | No foam, clarity 3 | No foam, clarity 10 | No foam, clarity 7 |
| Day 29 | Clarity 10 | Clarity 1 | Clarity 5 | Clarity 8 |

After 5 days, tank 1 had large amounts of green foam on top of the water, and tanks 3 and 4 had mild amounts of foam. The clarity of the water in all four tanks had not changed.

After 15 days, the aeration rate on all of the tanks was decreased. The water in tanks 1, 3 and 4 was slightly green and the water in tank 4 was brown. Small amounts of solid material were present at the top of tank 2.

After 20 days, none of the tanks had any foaming. The clarity of tank 4 had worsened, presumably due to the lower aeration rate. Larger amounts of solid material were present in tank 2, both on the bottom of the tank and floating on the water surface.

After 29 days, the water in tank 2 was completely clear.

TABLE 17

Water sampling from Trial 11.

| | Starting Water | Tank 1 | Tank 2 |
|---|---|---|---|
| pH | 7.4 | 7.9 | 7.9 |
| Turbidity | 68.7 mg/L | 36.8 mg/L | 9.3 mg/L |
| Suspended Solids | 101 mg/L | 108 mg/L | 100 mg/L |
| BOD | 34 mg/L | 28.5 mg/L | 12 mg/L |
| DO | 1.47 mg/L | 6.2 mg/L | 5.8 mg/L |
| Total filt. solids | 3724 mg/L | 16186 mg/L | 19340 mg/L |

Table 17 shows that the turbidity of the water was significantly decreased in line with the clarity observations. The Biochemical Oxygen Demand (BOD) had decreased as there was less waste to be broken down. The dissolved oxygen was lower in the starting water as there was no aeration in the pond from which the water was sourced.

Trial 12

A first 9 kg block of composition C20 was placed into an unaerated sewage pond (about 1 600 000 L; salt content 6000 ppm). A second 9 kg block of composition C20 was placed in the overflow region of the sewage pond to an overflow pond. The pond was green and murky and the visibility was less than 1 cm. The overflow pond was about 5 cm deep and was dark green with large amounts of foam.

After 15 days, the visibility of the sewage pond had increased to about 30 cm.

After 29 days, the visibility of the sewage pond had increased to about 60 cm and the overflow pond was completely clear with only a small amount of foam.

Trial 13

Samples of town water taken from the Denham, Western Australia water supply were placed into two separate 20 L containers. One container was used as a control and into the second container was placed a 200 g block of composition C5. Both containers were aerated to create water movement. The containers were left for 18 days after which time samples were taken for analysis to determine whether any leaching from the composition was occurring. It is apparent from the results shown in Table 18 below that there was no significant leaching of any of the substances tested from the composition.

TABLE 18

Water sampling from Trial 13.

| Analysis | Units | Control | C5 |
|---|---|---|---|
| pH | | 6.8 | 6.7 |
| Conductivity @ 25° C. | µS/cm | 870 | 860 |
| Total Dissolved Solids @ 180° C. | mg/L | 3,600 | 440 |
| d14-p-terphenyl (surrogate) | % Rec. | 84 | 70 |
| TRH Surrogate | % | 79 | 71 |
| Free Cyanide | mg/L | <0.01 | 0.03 |
| BTEX Surrogate (Trifluorotoiuene) % Rec. | % Rec. | 70 | 103 |
| Hydrocarbons C6-C9 | µg/L | <40 | <40 |
| Soluble Arsenic, As | mg/L | <0.001 | <0.001 |
| Barium, Ba | mg/L | <0.005 | <0.005 |
| Cadmium, Cd | mg/L | <0.002 | <0.002 |
| Chromium, Cr | mg/L | <0.005 | <0.005 |
| Copper, Cu | mg/L | <0.01 | <0.01 |
| Nickel, Ni | mg/L | <0.005 | <0.005 |
| Lead, Pb | mg/L | <0.04 | <0.04 |
| Zinc, Zn | mg/L | 0.09 | 0.09 |
| Naphthalene µg/L | µg/L | <0.5 | <0.5 |
| 2-methylnaphthalene | µg/L | <0.5 | <0.5 |
| 1-methylnaphthalene # | µg/L | <0.5 | <0.5 |
| Acenaphthylene | µg/L | <0.5 | <0.5 |
| Acenaphthene | µg/L | <0.5 | <0.5 |
| Fluorene | µg/L | <0.5 | <0.5 |
| Phenanthrene | µg/L | <0.5 | <0.5 |
| Anthracene | µg/L | <0.5 | <0.5 |

TABLE 18-continued

Water sampling from Trial 13.

| Analysis | Units | Control | C5 |
|---|---|---|---|
| Fluoranthene | µg/L | <0.5 | <0.5 |
| Pyrene | µg/L | <0.5 | <0.5 |
| Benzo[a]anthracene | µg/L | <0.5 | <0.5 |
| Chrysene | µg/L | <0.5 | <0.5 |
| Indeno[123-cd]pyrene | µg/L | <0.5 | <0.5 |
| Dibenzo[ah]anthracene | µg/L | <0.5 | <0.5 |
| Benzo[ghi]perylene | µg/L | <0.5 | <0.5 |
| Benzene | µg/L | <0.5 | <0.5 |
| Toluene | µg/L | <0.5 | <0.5 |
| Ethyl Benzene | µg/L | <0.5 | <0.5 |
| Benzo [bk] fluoranthene | µg/L | <1 | <1 |
| Benzo[a]pyrene | µg/L | <0.01 | <0.01 |
| Xylenes | µg/L | <1.5 | <1.5 |
| TRH C10-C14 | µg/L | <40 | <40 |
| TRH C15-C28 | µg/L | <200 | <200 |
| TRH C29-C36 | µg/L | <200 | <200 |

Trial 14

800 L tanks were filed with samples of waste water containing fish offal from a fish factory in Shark Bay, Western Australia. 3 kg of C33 was placed in one tank and the other used as a control. Both tanks had mild aeration and were in full sun. The water was initially black and is putrid to smell.

TABLE 18

Clarity observations of water over time from Trial 14.

| Period | Control | C33 |
|---|---|---|
| Day 1 | Water contains strong odour with foaming and floating white solid. No clarity. | Water same black colour and no other changes. No clarity. |
| Day 6 | Water pink/brown. No clarity. | Water a lighter shade of black. Increased clarity. |
| Day 9 | Pink/brown colour darkened. No clarity. | Water light brown. Increased clarity. |
| Day 15 | Pink/brown colour faded (similar to day 6). No clarity. | Water light green. Water bugs swimming in tank (rowing bugs). No odour. |
| Day 20 | Light pink/brown. No clarity. 70% of tank covered with tarpaulin. | Water dark green with algae growth. 70% of tank covered with tarpaulin. |
| Day 25 | Water light green. No clarity. Strong odour remains. | Water colourless. Bottom of tank (1 m) visible. Green algae growth present on sides of tank. |

On day 20, 70% of the surface of both tanks were covered with tarpaulins. Previous trials had indicated that the composition does not necessarily prevent algae growth in direct sunlight.

TABLE 19

Water sampling from Trial 14.

| Analysis | Units | 1 | 2 |
|---|---|---|---|
| Naphthalene | µg/L | <0.5 | <0.5 |
| 2-methylnaphthalene | µg/L | <0.5 | <0.5 |
| 1-methylnaphthalene | µg/L | <0.5 | <0.5 |
| Acenaphthylene | µg/L | <0.5 | <0.5 |
| Acenaphthene | µg/L | <0.5 | <0.5 |
| Fluorene | µg/L | <0.5 | <0.5 |
| Phenanthrene | µg/L | <0.5 | <0.5 |
| Anthracene | µg/L | <0.5 | <0.5 |
| Fluoranthene | µg/L | <0.5 | <0.5 |
| Pyrene | µg/L | <0.5 | <0.5 |
| Benzo[a]anthracene | µg/L | <0.5 | <0.5 |
| Chrysene | µg/L | <0.5 | <0.5 |
| Benzo [bk] fluoranthene | µg/L | <1 | <1 |
| Benzo[a]pyrene | µg/L | <0.5 | <0.5 |
| Indeno[123-cd]pyrene | µg/L | <0.5 | <0.5 |
| Dibenzo[ah]anthracene | µg/L | <0.5 | <0.5 |
| Benzo[ghi]perylene | µg/L | <0.5 | <0.5 |
| PAH Total | µg/L | <3 | <3 |
| d14-p-terphenyl (surrogate) | % | 30 | 96 |
| Hydrocarbons $C_6$-$C_9$ | µg/L | <40 | <40 |
| TRH $C_{10}$-$C_{14}$ | µg/L | <40 | <40 |
| TRH $C_{15}$-$C_{28}$ | µg/L | <200 | <200 |
| TRH $C_{29}$-$C_{36}$ | µg/L | <200 | <200 |
| TRH $C_{10}$-$C_{14}$ | mg/L | <0.04 | <0.04 |
| TRH $C_{15}$-$C_{28}$ | mg/L | <0.2 | <0.2 |
| TRH $C_{29}$-$C_{38}$ | mg/L | <0.2 | <0.2 |
| TRH Surrogate | % | 18 | 64 |
| Benzene | µg/L | <0.5 | <0.5 |
| Toluene | µg/L | <0.5 | <0.5 |
| Ethyl Benzene | µg/L | <0.5 | <0.5 |
| Xylenes | µg/L | <1.5 | <1.5 |
| BTEX Surrogate (Trifluorotoluene) | % | 104 | 100 |
| Soluble Arsenic, As | mg/L | 0.02 | 0.02 |
| Soluble Barium, Ba | mg/L | <0.01 | <0.01 |
| Soluble Cadmium, Cd | mg/L | <0.001 | <0.001 |
| Soluble Chromium, Cr | mg/L | <0.005 | <0.005 |
| Soluble Copper, Cu | mg/L | <0.005 | <0.005 |
| Soluble Nickel, Ni | mg/L | <0.005 | <0.005 |
| Soluble Zinc, Zn | mg/L | <0.005 | <0.005 |
| Soluble Lead, Pb | mg/L | <0.005 | <0.005 |
| pH | pH Units | 8.6 | 8.6 |
| Conductivity @ 25° C. | µS/cm | 4500 | 2100 |
| Total Dissolved Solids @ 180° C. | mg/L | 2400 | 1200 |
| Total Alkalinity as $CaCO_3$ | mg/L | 270 | 140 |
| Heterotrophic Plate Count @ 21° C. | CFU/mL | 9900 | 140000 |
| Heterotrophic Plate Count @ 37° C. | CFU/mL | 9600 | 11000 |
| Total Coliforms | CFU/100 mL | 0 | 0 |
| Faecal (Thermotolerant) Coliforms | CFU/100 mL | 0 | 0 |
| Sulphate, $SO_4$ | mg/L | 72 | 120 |
| Chloride, Cl | mg/L | 720 | 780 |
| Ferrous Iron, $Fe^{2+}$ # | mg/L | <0.05 | <0.05 |
| Ferric Iron, $Fe^{3+}$ # | mg/L | 0.1 | <0.05 |

TABLE 19-continued

Water sampling from Trial 14.

| Analysis | Units | 1 | 2 |
| --- | --- | --- | --- |
| Soluble Iron, Fe | mg/L | 0.1 | <0.02 |
| Soluble Barium, Ba | mg/L | <0.01 | <0.01 |
| Calcium, Ca | mg/L | 110 | 68 |
| Magnesium, Mg | mg/L | 67 | 57 |
| Potassium, K | mg/L | 100 | 93 |
| Sodium, Na | mg/L | 770 | 670 |
| Soluble Manganese, Mn | mg/L | 0.008 | <0.005 |
| Soluble Aluminium, Al | mg/L | <0.02 | <0.02 |
| cBOD | mg/L | <5 | 10 |
| Chemical Oxygen Demand | mg/L | 48 | 110 |
| Total Suspended Solids @103° C. | mg/L | <5 | 110 |
| Dissolved Oxygen | mg/L | 7.7 | 7.6 |
| Total Nitrogen | mg/L | 15 | 14 |
| Nitrate, $NO_3$ | mg/L | 4.6 | 0.1 |
| Nitrite, $NO_2$ | mg/L | 46 | 0.18 |
| Organic Nitrogen as N | mg/L | <0.2 | 6.7 |
| Ammonia Nitrogen $NH_3$—N | mg/L | <0.1 | 7.8 |
| Total Phosphorus | mg/L | 5 | 2.9 |

Modifications and variations such as would be apparent to a skilled addressee are deemed to be within the scope of the present invention.

The claims defining the invention are as follows:

1. A water treatment composition, comprising:
   a treating component and a support,
   wherein the treating component is a liquid organic compound in the form of an oil;
   the support is a solid organic compound comprising wax, the wax being in the form of long chain hydrocarbons or esters of long chain alcohols and long chain fatty acids; and
   the treating component and support are in direct physical contact with a volume of water comprising undesired contaminants treatable by the water treatment composition.

2. A water treatment composition according to claim 1, wherein the treating component is substantially insoluble in the volume of water.

3. A water treatment composition according to claim 1, wherein the support is substantially insoluble in the volume of water.

4. A water treatment composition according to claim 1, wherein the support substantially inhibits the treating component from spreading throughout the volume of water.

5. A water treatment composition according to claim 1, wherein the support further comprises fats or greases or mixtures thereof.

6. A water treatment composition according to claim 5, wherein the wax is provided in the form of long chain hydrocarbons and esters of long chain alcohols and long chain fatty acids.

7. A water treatment composition according to claim 5, wherein the wax is petroleum wax.

8. A water treatment composition according to claim 5, wherein the support comprises at least one of paraffin wax and microcrystalline wax.

9. A water treatment composition according to claim 1, wherein the treating component is provided in the form of a mineral oil.

10. A water treatment composition according to claim 9, wherein the oil is a paraffin oil.

11. A water treatment composition according to claim 1, wherein the oil comprises between about 0.1 to 40% by weight of the composition.

12. A water treatment method, comprising:
    adding a water treatment composition to a volume of water comprising undesired contaminants treatable by the water treatment composition,
    the water treatment composition comprising a treating component and a support,
    the treating component being a liquid organic compound in the form of an oil, and
    the support comprising a solid organic compound comprising wax, the wax being in the form of long chain hydrocarbons or esters of long chain alcohols and long chain fatty acids.

* * * * *